(12) United States Patent
Hollinger et al.

(10) Patent No.: US 11,204,143 B1
(45) Date of Patent: Dec. 21, 2021

(54) SOLAR DISK LIGHT WITH MOSAIC PATTERN

(71) Applicant: E. MISHAN & SONS, INC., New York, NY (US)

(72) Inventors: Fred Hollinger, Monroe Township, NJ (US); Robert Chung, Taipei (TW); Thomas Chung, Taipei (TW)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 17/337,580

(22) Filed: Jun. 3, 2021

(51) Int. Cl.
| | |
|---|---|
| *F21S 9/03* | (2006.01) |
| *F21V 23/04* | (2006.01) |
| *F21V 23/00* | (2015.01) |
| *F21V 21/08* | (2006.01) |
| *F21V 3/02* | (2006.01) |
| *F21Y 105/18* | (2016.01) |
| *F21Y 115/10* | (2016.01) |

(52) U.S. Cl.
CPC ............... *F21S 9/03* (2013.01); *F21V 3/02* (2013.01); *F21V 21/0824* (2013.01); *F21V 23/003* (2013.01); *F21V 23/04* (2013.01); *F21Y 2105/18* (2016.08); *F21Y 2115/10* (2016.08)

(58) Field of Classification Search
CPC .......... F21S 9/03; F21V 3/02; F21V 21/0824; F21V 23/003; F21V 23/04; F21Y 2105/18; F21Y 2115/10
USPC ........................................ 362/311.02
See application file for complete search history.

(56) References Cited

U.S. PATENT DOCUMENTS 10,161,583 B1 * 12/2018 Stobart .................. F21S 9/037

* cited by examiner

*Primary Examiner* — Rajarshi Chakraborty
*Assistant Examiner* — Hana S Featherly
(74) *Attorney, Agent, or Firm* — Notaro, Michalos & Zaccaria P.C.

(57) ABSTRACT

A solar disk light has a central body and an annular shelf surrounding the central body and attached to the central body by one or more struts, defining a gap between an inner surface of the annular shelf and the central body. LEDs are disposed on the annular shelf. The central body has solar cells for harvesting solar energy and detecting ambient light. The central body contains a rechargeable battery for storing harvested solar energy, a switch, and wiring and driver electronics for operably connecting the solar cells, battery, switch, and LEDs. A translucent shell is on the disk light body, covering the annular shelf and LEDs, such that light emitted by the LEDs shines through the shell. The shell has an opening for receiving the central body such that the solar cells are not covered by the shell, the shell having an inner wall received in the gap.

7 Claims, 7 Drawing Sheets

SOLAR DISK LIGHT WITH MOSAIC PATTERN

FIELD AND BACKGROUND OF THE INVENTION

The subject technology relates to small solar-powered lighting devices for portable or landscape use.

SUMMARY OF THE INVENTION

According to an aspect of the subject technology, a portable or landscape lamp or luminaire for illumination or decorative lighting consists of a self-contained light source, for example a disk light, including a disk light body comprising a central body, which is hollow to contain certain operative elements of the light, an annular shelf surrounding the central hollow body and attached to it by one or more struts, light-emitting diodes (LEDs) disposed on the annular shelf, solar cells for collecting solar energy to power the LEDs and disposed on a roof of the central body, a rechargeable battery for storing energy collected by the solar cells disposed within the central body, and driver circuitry to power the LEDs with the stored energy. The disk light body is at least partly enclosed by a shell of translucent or transparent material.

For use as a landscape light, a mounting spike is attached to the central body, for affixing the lighting fixture to the ground. The mounting spike is preferably removable from the frame and consists of two interlocking blades. Each blade has integrally formed attachment arms for attaching the blade to the central body.

In an non-limiting embodiment, a disk light comprises a disk light body comprising a central body and an annular shelf surrounding the central body and attached to the central body by one or more struts, defining a gap between an inner surface of the annular shelf and the central body; LEDs disposed on the annular shelf; the central body having solar cells on an outer surface thereof for harvesting solar energy and detecting ambient light; the central body containing lighting components comprising a rechargeable battery for storing harvested solar energy, switch having an ON position and an OFF position for enabling and disabling electrical power delivery to the LEDs from the battery, and wiring and driver electronics for operably connecting the solar cells, battery, switch, and LEDs, the wiring and driver electronics configured to deliver electrical power to the LEDs from the battery when the switch is in the ON position and the solar cells are not detecting ambient light and to cut off power to the LEDs when the switch is in the OFF position or the solar cells are detecting ambient light; a shell on the disk light body, the shell being translucent and covering the annular shelf and LEDs, such that light emitted by the LEDs shines through the shell, the shell having an opening for receiving the central body such that the solar cells are not covered by the shell, the shell having an inner wall received in the gap.

In a further non-limiting embodiment, the disk light further comprises a landscape spike removably attached to the disk light body, the landscape spike configured for insertion into the ground, thereby affixing the solar disk light to the ground.

In a further non-limiting embodiment, the shell comprises translucent decorative elements disposed on or in the shell such that light emitted by the LEDs shines through the translucent decorative elements.

In a further non-limiting embodiment, an opaque substance is disposed on the surface of the shell between the translucent decorative elements to partially or fully block light emitted by the LEDs.

In a further non-limiting embodiment, the translucent decorative elements are disposed on or in a top of the shell, and on or in the sides of the shell.

In a further non-limiting embodiment, the LEDs are attached to one or more arc-shaped PCBs, the arc-shaped PCBs attached to the annular shelf.

In a further non-limiting embodiment, a kit for making a solar disk light assembly, comprises a solar disk light as previously described, and a pair of blades configured to be interlocked together to form a landscape spike which is configured to be removably attached to the central body and also configured for insertion into the ground, thereby affixing the solar disk light to the ground.

The various features of novelty which characterize the subject technology are pointed out with particularity in the claims annexed to and forming a part of this disclosure. For a better understanding of the subject technology, its operating advantages and specific objects attained by its uses, reference is made to the accompanying drawings and descriptive matter in which preferred embodiments of the subject technology are illustrated.

DETAILED DESCRIPTION OF THE INVENTION

According to a non-limiting aspect of the subject technology, as shown in Figures, disk light 1 comprises a disk light body 10 in translucent shell 50. Disk light body 5 comprises hollow central body 11 which is adapted to carry solar cells 16 for harvesting solar energy and detecting ambient light; and to house rechargeable battery 15 for storing the harvested solar energy, switch 20 for manually operating the light, and wiring and driving electronics (the electronics disposed on PCB 17) to operatively connect the battery 15, solar cells 16, switch 20, and other components. In an embodiment, hollow central body 11 comprises housing 19 and lid 18, which is removable to permit access to the interior components. In this embodiment, solar cells 16 are disposed on lid 18.

Disk light body 5 further comprises an annular shelf 12 surrounding central body 11 and connected thereto by one or more struts 22 (only one is numbered). A gap 21 is defined between annular shelf 12 and central body 11. High-power COB or surface mount LEDs 13 (only two are numbered in the Figures) for emitting light are disposed on the annular shelf and are operatively and electrically connected to battery 15, solar cells 16, switch 20, PCB 17, and the wiring and driving electronics. In the embodiment shown, disk light 1 has six LEDs 13, but in other embodiments may have 1 to 12 LEDs or more. In the embodiment shown, the LEDs are attached to a plurality of arc-shaped auxiliary PCBs 14 (only one is numbered), which in turn are attached to annular shelf 12.

The switch 20, wiring and driver electronics are configured to deliver electrical power to the LEDs from the battery 15 (thereby turning the LEDs on) when the switch is in the ON position and the solar cells 16 are not detecting ambient light; and to cut off power to the LEDs (thereby turning the LEDs off) when the switch is in the OFF position or the solar cells 16 are detecting ambient light. The solar cells 16, battery 15, LEDs 13, switch 20, and wiring and driver electronics are as known to those of skill in the art.

Translucent shell 50 is disposed on and removably connected to disk light body 10. Shell 50 is adapted to cover annular shelf 12 and the LEDs 13 thereon, while exposing at least the roof or lid 18 of central body 11 and the solar panels 16 thereon. Accordingly, shell 50 has an opening 55 for receiving central body 11, while the top and sides of shell 50 cover annular shelf 12 and the LEDs 13 thereon. An inner wall 56 of shell 50 is disposed within gap 21 when shell 50 is assembled to disk light body 10.

Advantageously, shell 50 is made of a translucent material such as glass, acrylic plastic, or other such material. In an embodiment, translucent decorative elements 53 (only three are numbered in the Figures) are disposed on or within shell 50. Translucent decorative elements 53 may be colored with various contrasting colors and may be in various shapes and sizes, and artfully disposed on or within shell 50 to achieve a pleasing appearance, for example, in the manner of a mosaic. The spaces if any between translucent decorative elements 53 may be filled in by an opaque paint or similar opaque substance applied to the surface of shell 50. In use, the light emitted by LEDs 13 shines through shell 50 and any translucent decorative elements 53 thereon, except for the portions of the surface of shell 50 covered by the opaque substance.

Figure 1:
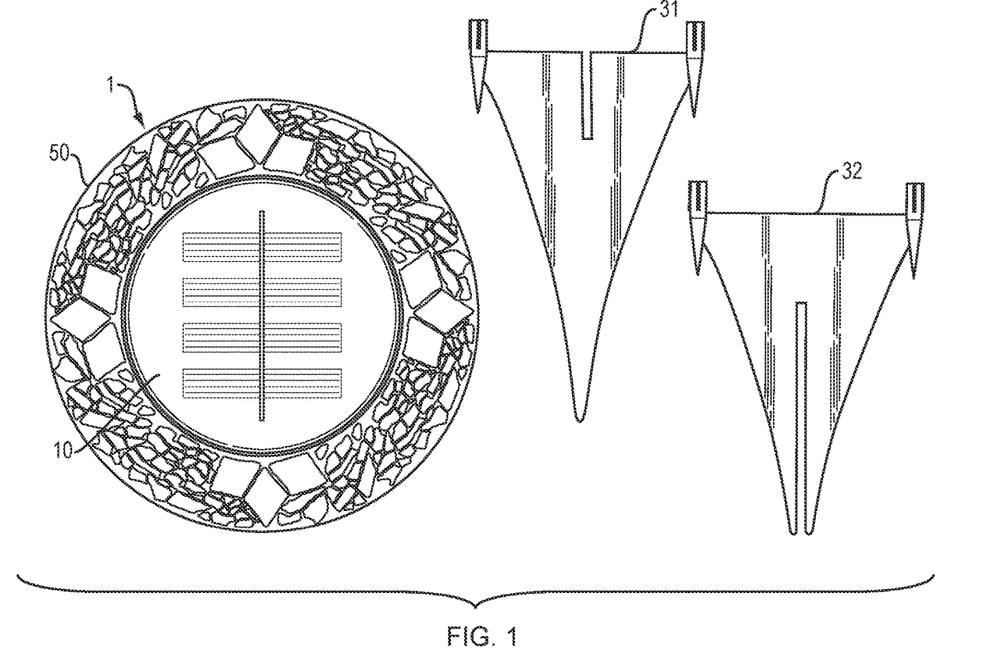
FIG. 1 is a top view of a disk light according to a non-limiting embodiment of the subject technology, together with landscape spikes.
Figure 2:
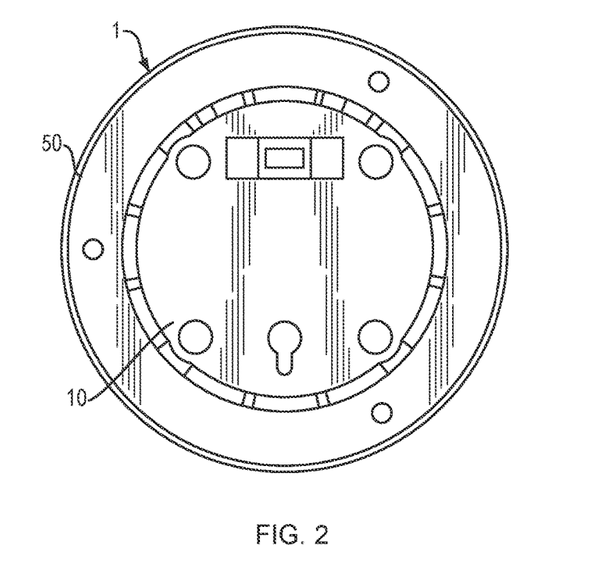
FIG. 2 is a bottom view of the disk light according to a non-limiting embodiment of the subject technology.
Figure 3:
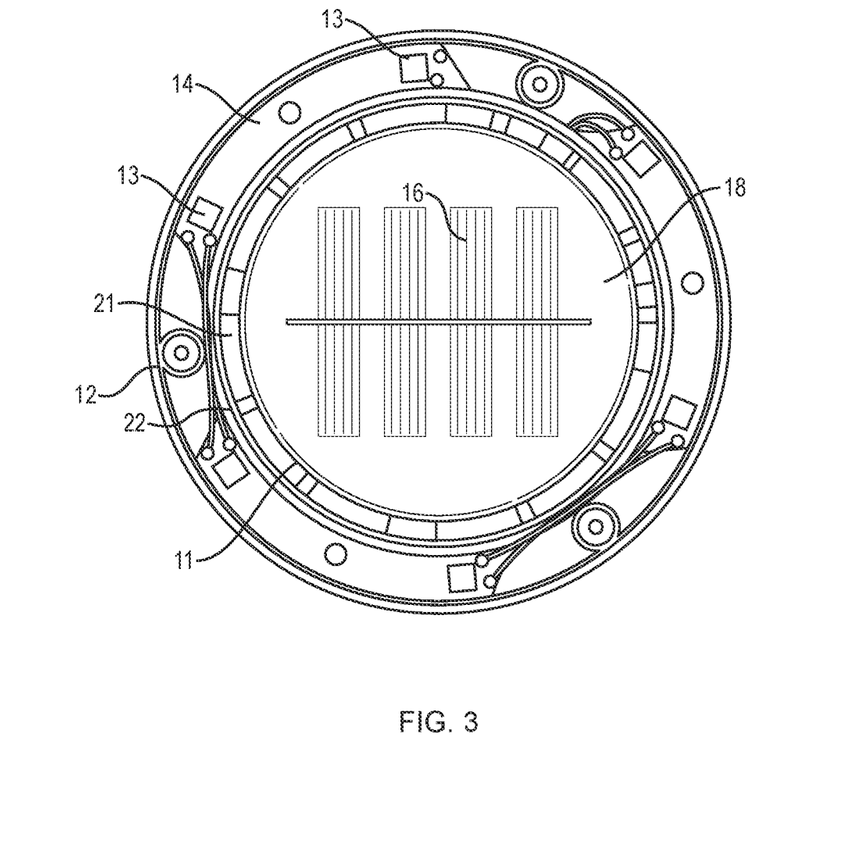
FIG. 3 is a top view of the disk light with the shell removed, according to a non-limiting embodiment of the subject technology.
Figure 4:
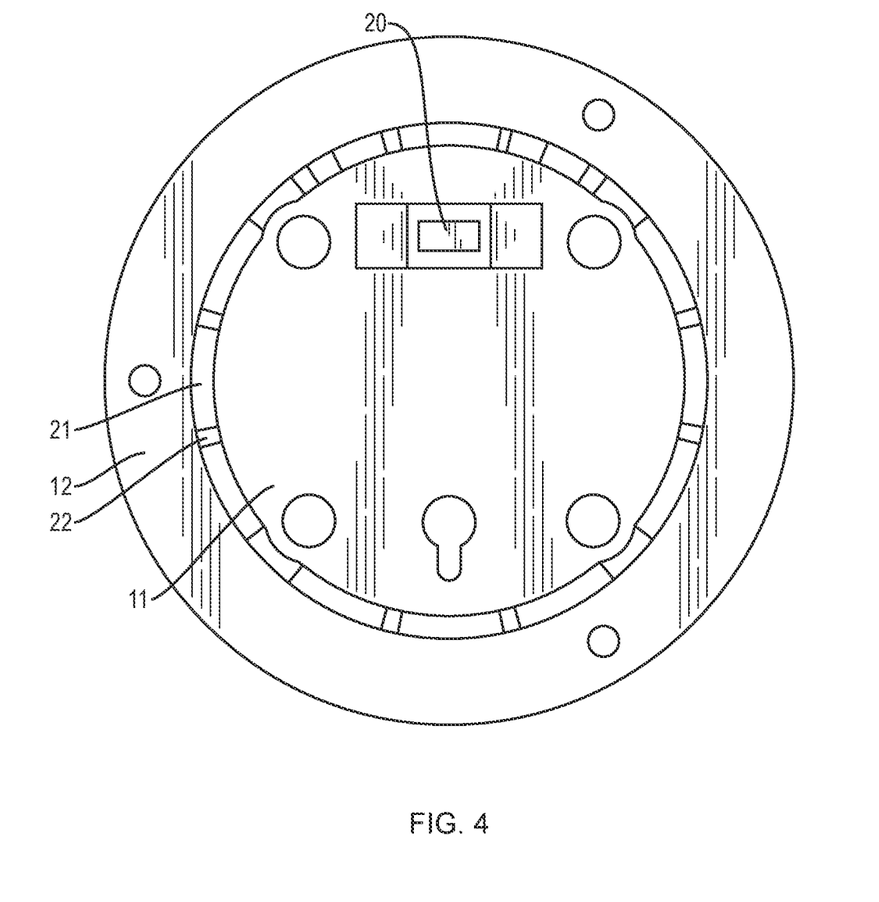
FIG. 4 is a bottom view of the disk light with the shell removed, according to a non-limiting embodiment of the subject technology.
Figure 5:
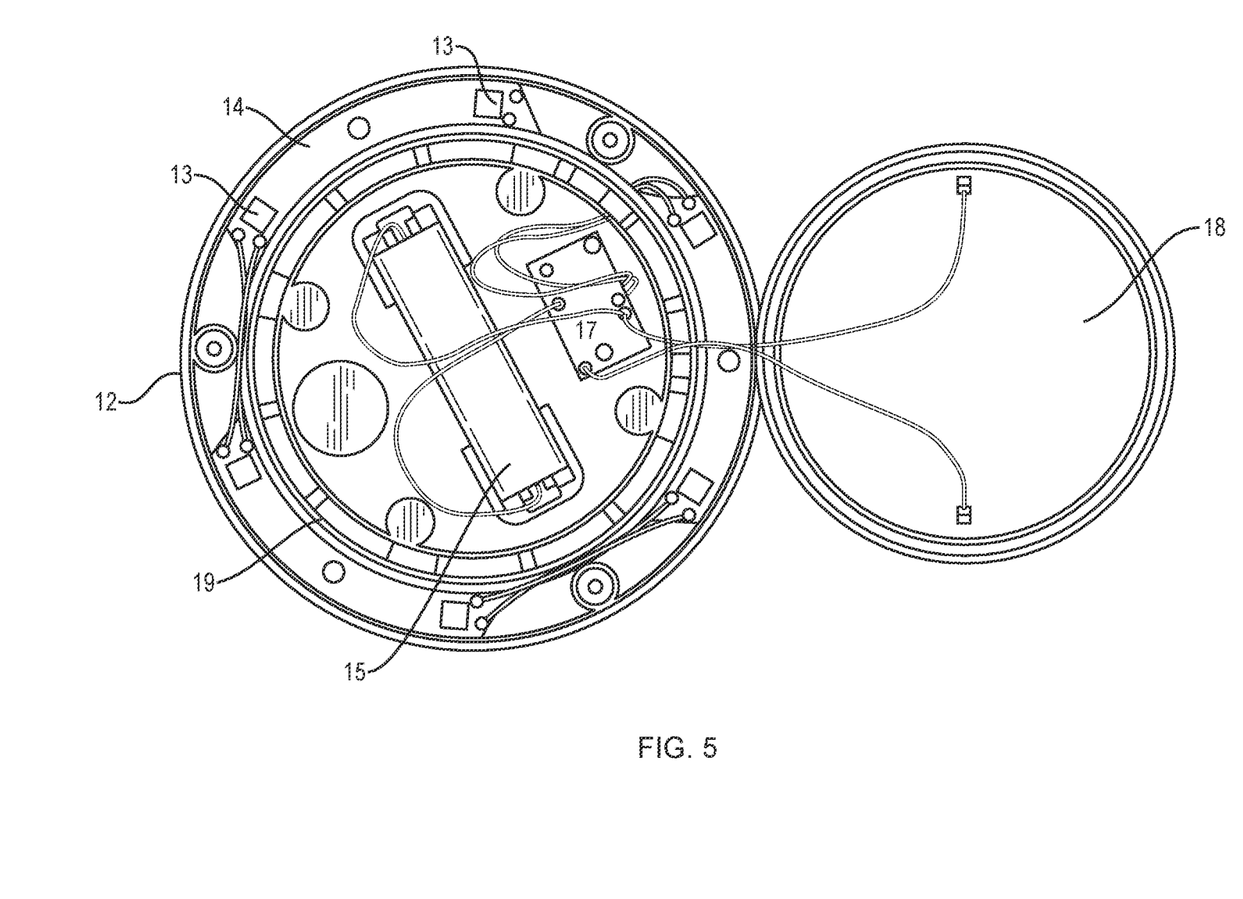
FIG. 5 is a is a top view of the disk light with the shell removed, and the lid removed from the housing of the central body, according to a non-limiting embodiment of the subject technology.
Figure 6:
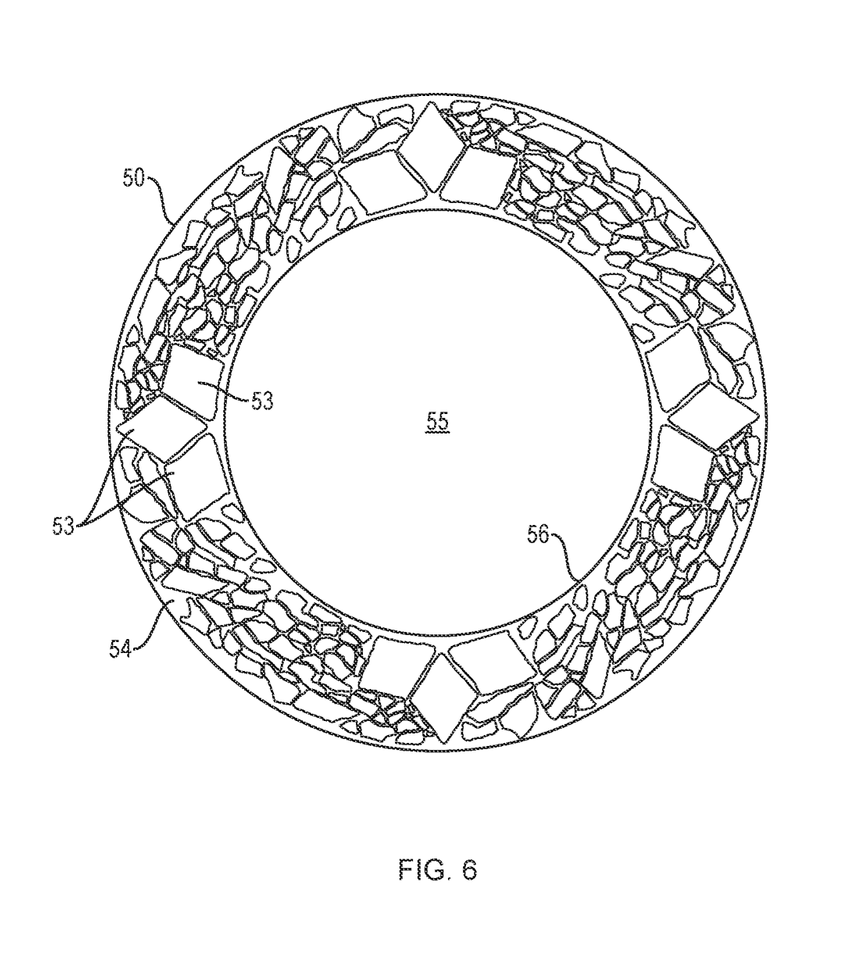
FIG. 6 is a top view of the shell of a disk light according to a non-limiting embodiment of the subject technology.
Figure 7:
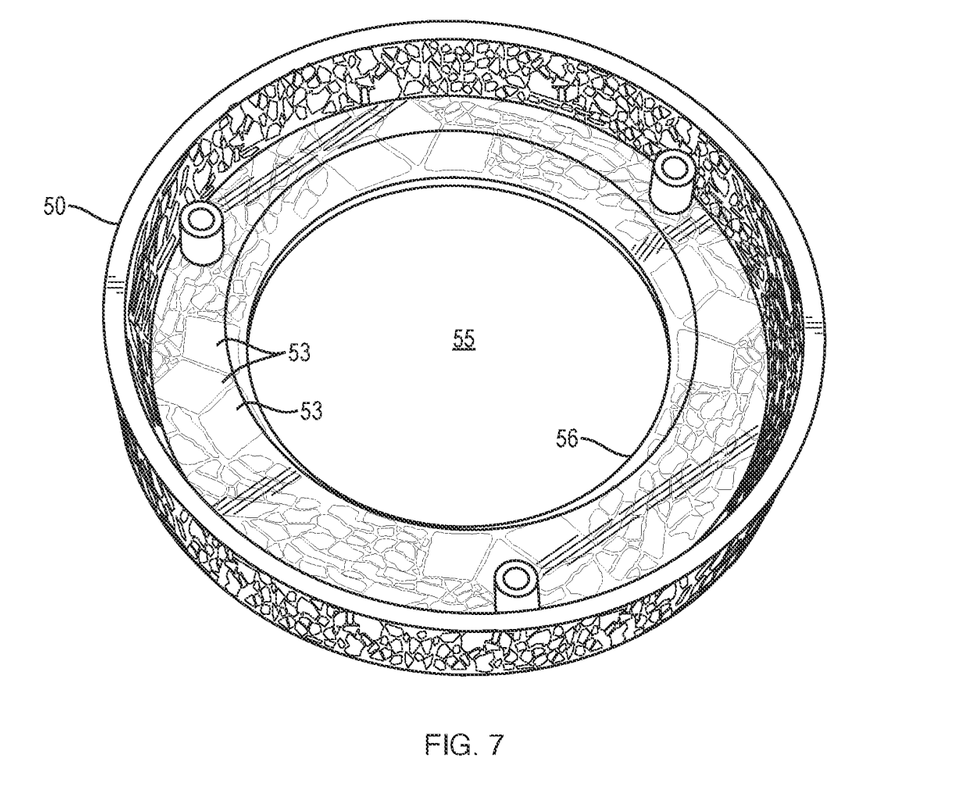
FIG. 7 is a bottom perspective view of the shell of a disk light according to a non-limiting embodiment of the subject technology.
Figure 8:
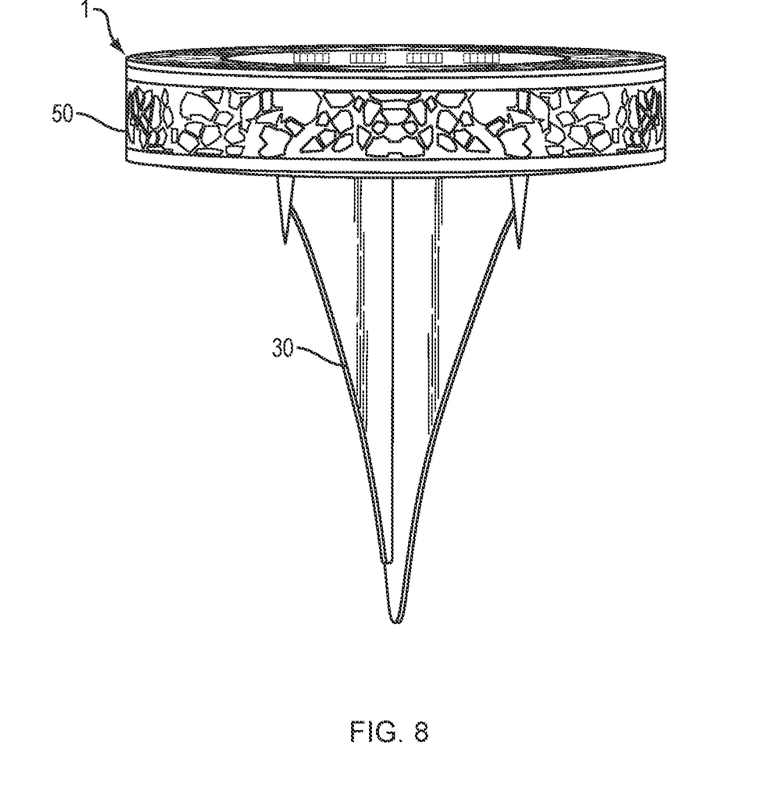
FIG. 8 is a view of the disk light assembled to a landscape spike according to a non-limiting embodiment of the subject technology.

As best seen in FIG. 2, central body 11 has recesses in its bottom surface to permit removable attachment of a landscape spike to disk light 1. As best seen in FIGS. 1 and 8, in the non-limiting embodiment shown, landscape spike 30 is composed of long blade 31 and short blade 32, which are preferably made of metal or plastic. Blades 31, 32 have, respectively, slots for assembling and interlocking the blades together to form spike 30, as shown. Blades 31, 32 have integrally formed pegs for insertion into the recesses to removably attach spike 30 to disk light 1.

According to a non-limiting embodiment of the subject technology, a landscape light kit comprises disk light 1, long blade 31 and short blade 32. The end-user assembles blades 31, 32 to form spike 30, and assembles spike 30 to disk light 1, to form a finished tiltable landscape disk light assembly.

It should be understood that the ornamental appearance of the disk lights and components thereof as shown in the Figures are within the scope of the subject technology.

Although the illustrated embodiment is round, the disk lights of the subject technology could be square, triangular, hexagonal, in an irregular shape, or any shape.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A solar disk light comprising:
a disk light body comprising a central body and an annular shelf surrounding the central body and attached to the central body by one or more struts, defining a gap between an inner surface of the annular shelf and the central body;
LEDs disposed on the annular shelf;
the central body having solar cells on an outer surface thereof for harvesting solar energy and detecting ambient light;
the central body containing lighting components comprising a rechargeable battery for storing harvested solar energy, a switch having an ON position and an OFF position for enabling and disabling electrical power delivery to the LEDs from the rechargeable battery, and wiring and driver electronics for operably connecting the solar cells, rechargeable battery, switch, and LEDs, the wiring and driver electronics configured to deliver electrical power to the LEDs from the rechargeable battery in the ON position and the solar cells are free of ambient light detection and to cut off power to the LEDs in the OFF position or the solar cells are detecting ambient light;
a shell on the disk light body, the shell being translucent and covering the annular shelf and LEDs, such that light emitted by the LEDs shines through the shell, the shell having an opening for receiving the central body such that the solar cells are free of the shell, the shell having an inner wall received in the gap.

2. The solar disk light of claim 1 further comprising a landscape spike removably attached to the disk light body, the landscape spike configured for insertion into the ground, thereby affixing the solar disk light to the ground.

3. The solar disk light of claim 1 wherein the shell comprises translucent decorative elements disposed on or in the shell such that light emitted by the LEDs shines through the translucent decorative elements.

4. The solar disk light of claim 3 wherein an opaque substance is disposed on the surface of the shell between the translucent decorative elements to partially or fully block light emitted by the LEDs.

5. The solar disk light of claim 3 wherein the translucent decorative elements are disposed on or in a top of the shell, and on or in the sides of the shell.

6. The solar disk light of claim 1 wherein the LEDs are attached to one or more arc-shaped PCBs, the arc-shaped PCBs attached to the annular shelf.

7. A kit for making a solar disk light assembly, the kit comprising a solar disk light according to claim 1, and a pair of blades having slots formed therein for assembling and interlocking the blades together to form a landscape spike removably attachable to the central body by pegs formed in the blades and also configured for insertion into the ground, thereby affixing the solar disk light to the ground.

* * * * *